April 12, 1938.     L. T. KELLIE     2,113,655
SHEET MATERIAL HANDLING DEVICE

Filed March 4, 1937

INVENTOR:
LLEWELLYN TRUEMAN KELLIE

BY Alex E. MacRae
ATTORNEY.

Patented Apr. 12, 1938

2,113,655

UNITED STATES PATENT OFFICE 2,113,655

SHEET MATERIAL HANDLING DEVICE

Llewellyn Trueman Kellie, Toronto, Ontario, Canada

Application March 4, 1937, Serial No. 129,097

4 Claims. (Cl. 216—56)

This invention relates to a device for placing sheet material on a cylindrical surface and has for an object the provision of means whereby photographic transmission negative films may be rapidly and accurately placed on the film cylinders of photographic transmission receiving machines.

Such films are slightly narrower in width than the receiving cylinder but their length is equal to the circumference of the cylinder whereby, when placed thereon, the end edges meet to cover, substantially completely, the outer surface of the cylinder. The line of meeting of the film ends must coincide with a fixed point on the cylinder. The present manual method of placing the film on the cylinder is awkward and inaccurate since it is difficult to ensure that the edges meet uniformly across the surface of the cylinder and also that the film is properly positioned on the cylinder.

The present invention eliminates the disadvantage of such manual handling of the negatives by providing accurate positioning means for both the negative and the cylinder in proper relation to each other.

Figure 1:
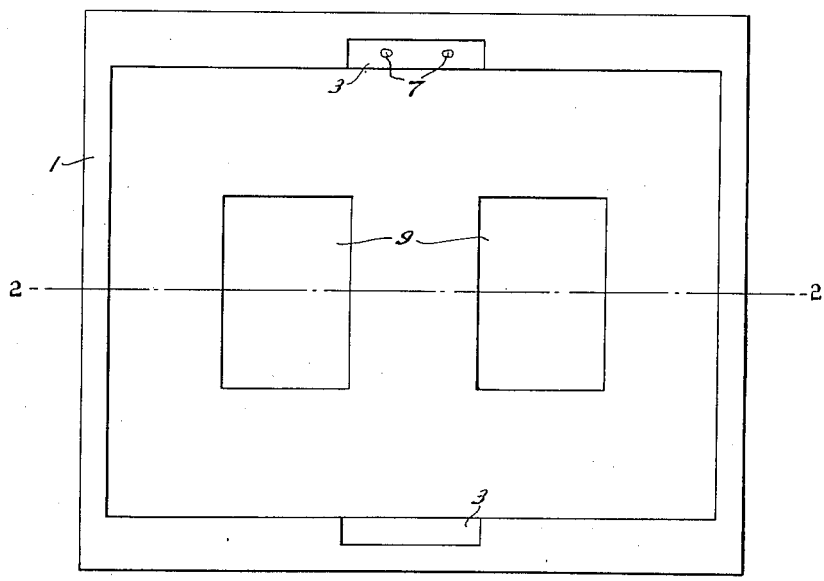
Figure 2:
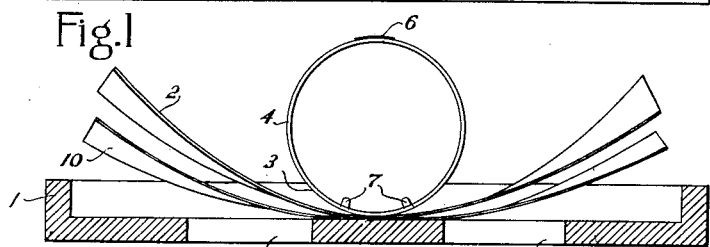
Figure 3:
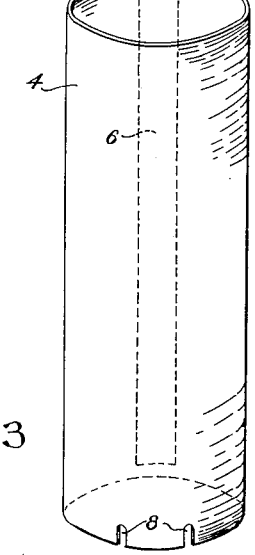

The invention will be described with reference to the accompanying drawing in which, Figure 1 is a plan of the device, Figure 2 is a section on line 2—2 of Figure 1 and showing the cylinder and negative in association with the device, and Figure 3 is a perspective view of the cylinder, a means for securing the negative ends thereto being also shown.

In the drawing, 1 is a frame in the form of a shallow tray adapted to receive a negative film 2, as shown in Figure 2, and the inner dimensions of which correspond exactly with the negative being handled. On either side of the tray, and centrally thereof, is provided a curved groove 3, the lower limit of which is substantially flush with the bottom of the tray, adapted to receive either end of a negative cylinder 4. The cylinder 4 is provided with a nick 5 and the ends of the negative must meet in a line passing through the exact centre of this nick. Double-backed adhesive tape 6 is usually provided to secure the negative ends to the cylinder. In order to accurately position the cylinder with respect to the negative, a pair of studs 7 are provided in one groove 3, which are set equi-distant from the centre of the groove, and which are arranged to cooperate with a corresponding pair of apertures or notches 8 in one end of the cylinder, whereby, when the cylinder is placed in the tray with the studs 7 engaging the notches 8, the proper meeting line for the negative ends will be at exactly the top centre of the cylinder. While positioning means for one end of the cylinder is believed to be sufficient, similar means may be provided for the other end. The notches 8 might be replaced by holes.

A pair of hand holes 9 are provided in the base of the tray and the thumb and fingers of the operator may be passed therethrough to place the negative firmly in place on the cylinder. A cloth or like material 10, of the same size as the tray, is fastened at the centre thereof and prevents the hands from touching the film during handling. For clarity of illustration the cloth 10 has been omitted from Figure 1.

It will be observed that, with the device described, the desired operation may be simply and rapidly carried out with substantially no possibility of improper placing of the film.

It is obvious that the device may readily be made adjustable to any size of film by slidingly mounting the ends and sides of the tray on the base and providing clamping means for locking the same in place in any desired position.

While the device has been described as being applicable to the placing of films on cylinders, its applicability to analogous uses will be readily appreciated.

I claim:

1. Device for mounting a flexible sheet on a cylinder comprising means for positioning the sheet in a flat position and means fixed with respect to said first-mentioned means for positioning the cylinder in a fixed position relative to said sheet.

2. Device for mounting a flexible sheet on a cylinder having a circumference equal to the length of the sheet comprising means for positioning the sheet in a flat position and means fixed with respect to said first-mentioned means for positioning the cylinder in a fixed position transversely of the sheet and at the central portion thereof to facilitate the wrapping of said sheet around the cylinder with its meeting end edges at the top centre of the cylinder.

3. Device for mounting a flexible sheet on a cylinder comprising a frame having a base and sides, said frame being adapted to receive a flexible sheet, one pair of opposite sides of said frame having opposite arcuate recesses, the lower limits of which are substantially flush with said base, said recesses being adapted to receive and support said cylinder, and means for retaining the cylinder in a fixed position in the recesses comprising studs mounted in at least one of said recesses, said cylinder having apertures adapted to cooperate with and to receive said studs.

4. A device for mounting a flexible sheet on a cylinder as defined in claim 3 wherein said base is provided with hand holes through which the sheet material may be wrapped around the cylinder, and a sheet of negative-protecting material secured between said hand holes to said base.

LLEWELLYN TRUEMAN KELLIE.